April 7, 1936.    F. WARLIMONT    2,036,902
COPPER REFINING FURNACE
Filed Nov. 14, 1934    3 Sheets-Sheet 2

Inventor.
Felix Warlimont
By  A. M. Deller
Attorney

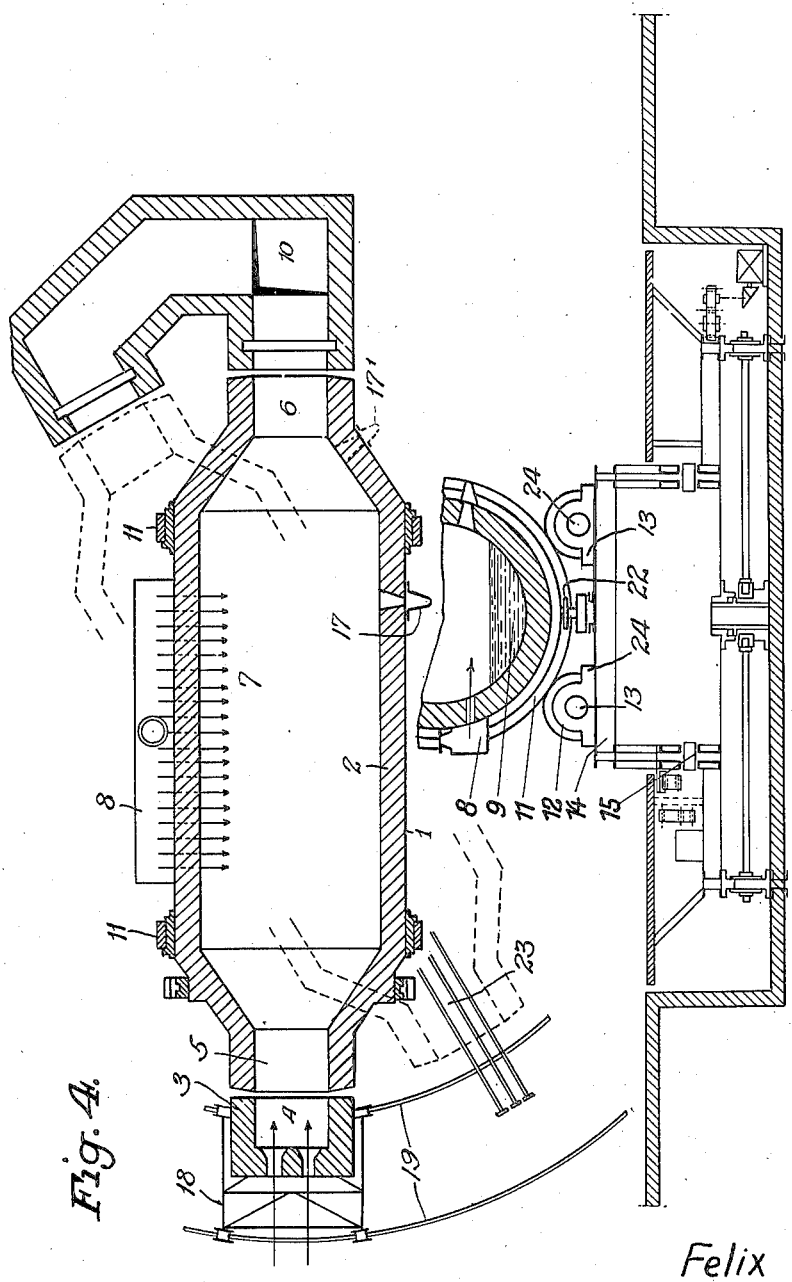

Patented Apr. 7, 1936

2,036,902

UNITED STATES PATENT OFFICE 2,036,902

COPPER REFINING FURNACE

Felix Warlimont, Hamburg, Germany, assignor to Metallgesellschaft Aktiengesellschaft, Frankfort-on-the-Main, Germany, a corporation of Germany Application November 14, 1934, Serial No. 752,907
In Germany February 15, 1932

12 Claims. (Cl. 266—33)

The present invention relates to a rotary furnace and more particularly to a large size, universally rotatable furnace for refining copper.

It is known that the refining of metals, for instance copper, comprised a number of steps such as charging, melting, skimming of the slag, oxidizing, poling, casting, etc., and that in order to insure good and efficient operation these steps had to be taken in consideration in the design of the refining furnace. It is also known that prior refining furnaces presented certain disadvantages and shortcomings and were not efficient or could not be efficiently adapted to requirements of the various steps of the refining process, whereby a considerable loss of time and extra expense in the treatment of the charge was involved. Thus, in stationary hearth furnaces the melting period was long and the furnace lining became highly overheated in places requiring frequent replacement and necessitating the use of silica bricks for the construction of the roof and side wall of the furnace. Furthermore, the copper was oxidized by blowing compressed air through iron pipes immersed in the molten bath. The use of iron air pipes was expensive due to the fact that the pipes became oxidized very quickly and necessitated frequent replacement, and increased the time required for the oxidation of the bath due to the fact that any attempt to increase the rate of oxidation by increasing the air flow through the pipes caused the molten copper to splash and attack the silica lining of the walls and roof of the furnace. Various forms of rotary cylindrical furnaces have been proposed for refining molten copper in which the oxidation of the charge was effected by blowing air through a number of nozzles in the body of the furnace in a manner similar to the blowing of a charge in a converter. While prior rotary furnaces eliminated some of the disadvantages of the stationary furnaces, they presented certain disadvantages and shortcomings which limited their size and were only applicable to the treatment of small charges. Thus, prior rotary furnaces were charged and discharged with difficulty, did not permit the use of a charging apparatus or of casting machines, did not allow the continuous utilization of the waste gases, and since all parts of the interior of the furnaces were not easily accessible difficulties were encountered in effectively poling the molten copper. Due to the aforementioned and other shortcomings, prior rotary furnaces were limited to a capacity of about 10 to 20 tons, and larger units having higher capacities up to 100 tons or more were built with a stationary melting chamber. Although many attempts were made to remedy the disadvantages noted hereinabove, none, as far as it is known, was entirely successful and no rotary furnace for refining copper has been proposed which was capable of treating charges of more than about 20 tons conveniently and economically.

It is an object of the present invention to provide a rotary tubular furnace which substantially eliminates the disadvantages and shortcomings noted hereinabove, which is efficient, practical and economical, which is easy to operate and which is capable of refining charges of 100 tons or more satisfactorily and economically.

It is another object of the present invention to provide a rotary tube furnace for refining copper in which the various steps of the refining process, such as charging, melting, skimming, oxidizing, poling, casting, etc., can be carried out easily, quickly and efficiently and which considerably decreases the length of time required for the individual steps, thereby saving a considerable amount of time and expense in the treatment of the charge.

A further object of the invention is to provide a rotary tubular furnace for refining copper in which the products of combustion can be utilized in a substantially continuous manner during the refining treatment.

It is also within the contemplation of the invention to provide a rotary tubular furnace having a capacity up to 100 tons or more which is capable of a larger output per unit time and which has a longer useful life than prior furnaces.

Other objects and advantages of the invention will become apparent from the following description taken in conjunction with the accompanying drawings, in which:—

Fig. 3 depicts a cross-sectional view of the apparatus shown in Fig. 1.

Fig. 4 shows a diagrammatic top view of another preferred embodiment of the present invention.

In general, the present invention provides a universal rotatable tubular furnace which comprises a stationary burner and stationary flue which are placed at the opposite ends of a tubular furnace which is capable of being rotated 360° around its horizontal axis and also 360° around its vertical axis. In certain cases, provisions may also be made for tilting the furnace to any desired angle from its horizontal direction. The rotatable tubular furnace is provided at both ends of its horizontal axis with ports which are not only used as inlets and outlets for the combustion gases but are also used for charging, skimming, poling, etc. As more fully explained hereinafter, the furnace is capable of being operated and serviced in various positions around its vertical axis while allowing the continuous withdrawal and utilization of the furnace gases and while rotating the same around its horizontal axis. During the firing period it is possible to rotate the furnace 180° around its vertical axis and to fire the furnace alternately from either end and to withdraw the gases from the opposite end. The furnace may then be swung to more convenient intermediate positions where poling, skimming, etc., may be carried out through either part at the ends of the furnace by rotating the furnace 180° around its vertical axis. For oxidizing the charge the walls of the furnace are provided with a series of air-nozzles.

Figure 1:
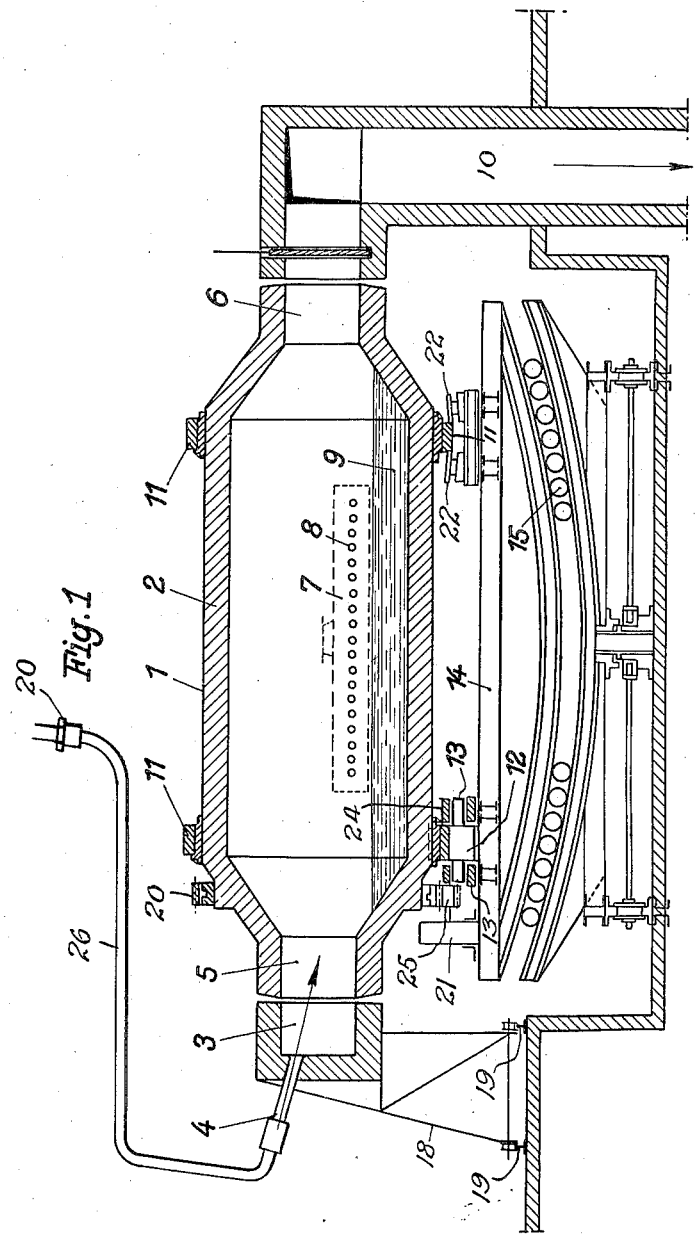
Fig. 1 illustrates a diagrammatic longitudinal side elevation of an apparatus, partly in section, embodying the present invention.

Referring more particularly to the drawings, reference character 1 indicates the body of a furnace embodying the present invention which is provided with a brick lining 2, preferably magnesite bricks. Furnace 1, which is cylindrical in shape and is provided at both ends with ports 5 and 6, is rotatably supported through rails 11 on rollers 12 and roller 13 running in bearings 24, whereby the furnace may be rotated around its horizontal axis. In order to rotate the furnace 360° around its vertical axis, bearing 24 is supported on a revolving base plate 14 which may be made to revolve horizontally 360°. The furnace may be tipped from its horizontal position by providing revolving base plate 14 with a tilting device 15. In order to prevent the furnace from slipping when it is tilted, pressure rollers 22 are mounted on base plate 14 on each side of rail 11. The furnace may be rotated and revolved by usual mechanical means. For instance, motor 21, which preferably is of the reversing type, may be made to drive gear 25 engaging ring gear 26 which is suitably fastened to the outer shell of the furnace, as shown in Fig. 1.

Associated with one of the end ports of the furnace 1 is a preheating chamber 3 which is fired by burner 4 and which does not revolve or rotate with the furnace. Burner 4 may be connected through a flexible conduit 26 and union 20 to any convenient source of fuel supply not shown in the drawings. Preheating chamber 13 and burner 4 are preferably mounted on movable frame 18 riding on rails 19, thereby permitting the burner and preheating chamber to be moved around in alignment with one of the parts of the furnace and fire the same for any position of the furnace around its vertical axis. The part at the opposite end is connected through duct C to a stack 10 which withdraws the gases of combustion to any convenient place where they can be utilized, for instance, to waste-heat boilers, not shown in the drawings. Connected to flue stack 10 are also ducts $B_1$ and $D_1$ through which the flue is connected to furnace 1 when the latter is swung to position B—$B_1$ or position D—$D_1$. In some cases, it may be sufficient to provide flue stack 10 with only two connections instead of three as shown in Fig. 4.

For oxidizing the charge, the furnace walls may be provided with a series of air nozzles 7 which are connected through air chamber 8 and through flexible connections to any suitable supply of compressed air, not shown in the drawing. As the nozzles 7 do not allow the furnace to be rotated 360° around its horizontal axis during the melting period, the nozzles may be omitted and the air for oxidation may be supplied in the usual manner through iron pipes 23 immersed into the bath through port 5 or 6, as shown in Fig. 4. It is preferable, however, to supply the air through a series of nozzles 7 in the walls of the furnace, as the latter method shortens considerably the oxidation period by bringing the air and the molten copper into more intimate and uniform contact. In this case the furnace is provided with a reversing motor 21 of known construction, by which the rotation of the furnace may be reversed as soon as the nozzles reach the level of the molten bath. The reversing motor oscillates the furnace back and forth through any desired angle instead of rotating the same 360°.

Figure 2:
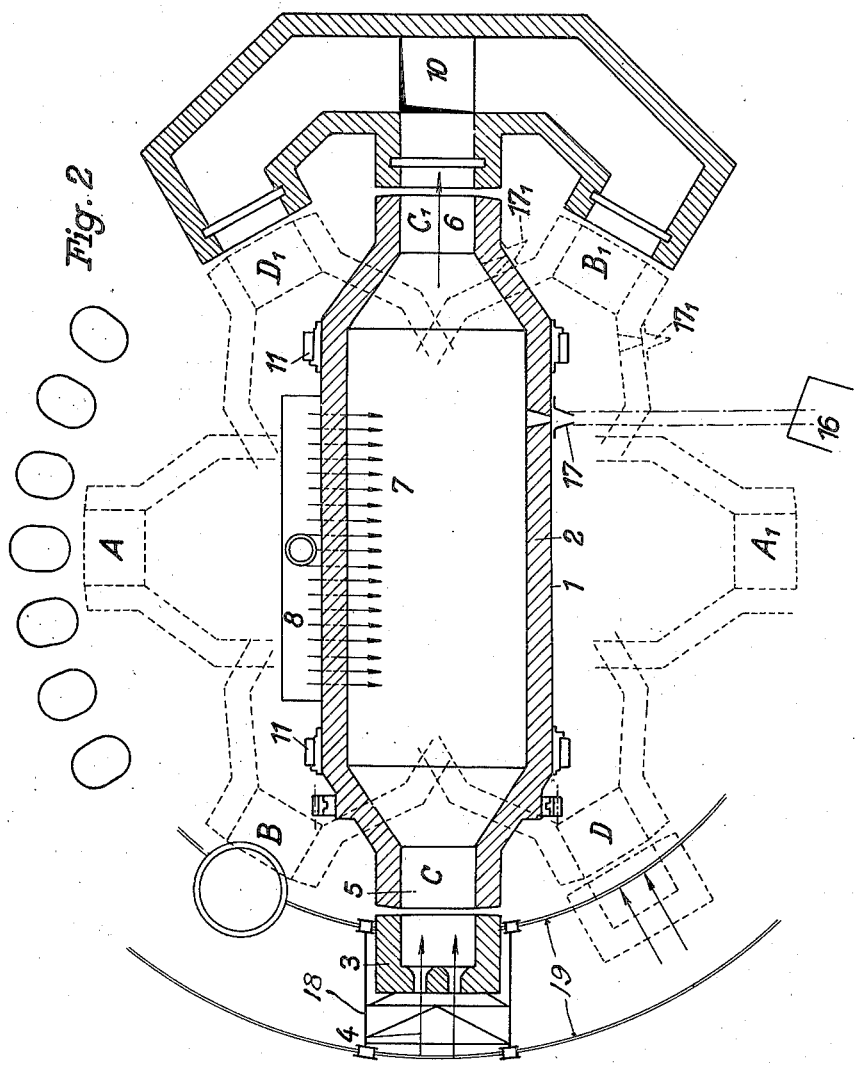
Fig. 2 is a top view of the apparatus shown in Fig. 1 with the heating chamber shown in various operating positions by dotted lines.

In carrying the invention into practice, for charging the furnace may be rotated into positions A—$A_1$, or B—$B_1$, as shown in Fig. 2. As soon as the furnace has been half charged in the position A—$A_1$ or B—$B_1$, it is rotated 180° around its vertical axis so that the outlet opening 6 which has been at the points $A_1$ or $B_1$ comes to points A or B, respectively. In this position, charging is completed by filling the other half of the furnace which is then rotated back into position C—$C_1$. Hereafter the melting process is started, the arrangement having the special advantage that after half of the furnace content facing the burner has been melted down, the furnace may be swung again 180° whereby the outlet 6 which so far was before at $C_1$ will be moved before the burner. In this manner, the unmelted part of the charge will be exposed to the immediate influence of the flames.

As soon as the charge has been melted down, the furnace is moved back into position B—$B_1$ to withdraw the slag. Advantage is taken of the possibility of inclining the furnace horizontally by means of arrangement 15 and the furnace is tipped so that the slag is just about flowing over. After removing the slag, the furnace is rotated back into position C—$C_1$ and is rotated around its horizontal axis so that the nozzle openings come under the surface of the bath. At the same time the nozzles are connected to the air supply and compressed air is blown into the bath. In this position, the charge may be continuously heated during the blowing. After enough slag has been formed, the furnace can be rotated into position B—$B_1$ and the slag removed again. Even in this position, if desired, the oxidizing process may be maintained because also here the outlet opening is connected at point $B_1$ to the stack so that the gases formed in the furnace may be removed without difficulty.

After having finished the oxidation, the poling is carried out in the position B—$B_1$ or D—$D_1$ of the furnace and in both of these positions the gases produced while poling the bath may be removed into the stack without contaminating the surroundings of the furnace.

After poling the furnace is rotated back again into position C—$C_1$ and the copper is cast by continuously tipping the furnace over a casting machine 16, which having a conventional design is not shown in detail. The copper flows from the furnace through the tap hole 17. Since in this position the path of the copper to the casting machine is rather long, it may be preferable to make provision for casting in the position B—B₁ or A—A₁. In the latter cases the tap hole is preferably arranged nearer one end of the furnace, for example at 17¹. The casting in position B—B₁ has the advangtage over position A—A₁ that in the former position the charge can be continuously re-heated. This may be realized by arranging burnerhead 3 and burner 4 movably on a rail, not shown in the drawings, so that it can be moved from position C into position B.

It is to be observed that the present invention provides a large size, universally rotatable tubular furnace for refining molten copper which can be operated easily and efficiently during all stages of the refining process. Thus, due to the fact that the furnace is provided with large openings at both ends of its longitudinal axis and due to the fact that the furnace is rotatable around its vertical axis, all parts of the furnace are easily accessible, even in large furnaces, and the charging, skimming poling operations, etc., can be carried out quickly and easily.

It is also to be noted that in the furnace provided by the present invention the melting period can be carried out at a much faster rate than it has heretofore been possible. Since the sides of the furnace do not have any large openings, the furnace can be rotated 360° around its horizontal axis during the melting period, and the heat from all parts of the hot brick lining is continually transmitted to the copper, thereby not only securing a greater heat efficiency but also preventing the furnace lining from becoming overheated. Furthermore, the melting period is considerably shortened by rotating the furnace 180° around its vertical axis so that the charge previously adjoining the outlet is put directly before the heating flame.

It is further to be noted that by rotating the furnace in positions B—B₁ or D—D₁, and by being able to reverse the same 180° in its horizontal position, all parts of the furnace chamber are easily accessible and skimming of the slag, poling, casting, etc., are greatly facilitated as compared to prior rotary furnaces. Moreover, the skimming of the slag is further aided by inclining the furnace from its horizontal position.

Furthermore, it is to be observed that the furnace gases can be withdrawn and utilized for heating purposes not only during the melting period, but also during the skimming, poling, and casting periods, and that the charge may also be fired during the casting period.

Moreover, when providing the furnace of the present invention with air nozzles, the oxidation period is shortened as compared with furnaces having a stationary chamber. When compared with prior rotary furnaces, usually equipped with charging doors at the side thereof, the furnace of the present invention presents the additional advantage that the sides of the furnace have no large openings and a continuous and stronger lining of circular bricks or of refractory material rammed in place can be used, thereby not only increasing the useful life of the furnace, but also decreasing the cost of construction.

It is to be observed that the present invention provides a universally rotatable furnace which is practical, eccnomical and easy to operate and which has a much larger capacity than prior rotary furnaces. The furnace is capable of refining copper efficiently and economically, considerably decreases the time required for individual steps of the refining process, and gives a larger output and has a higher useful life than prior copper refining furnaces.

Although the present invention has been described in conjunction with preferred embodiments, it is understood that modifications and variations may be resorted to without departing from the spirit and scope of the invention, as those skilled in the art will readily understand.

I claim:—

1. A rotary furnace for refining copper which comprises a substantially cylindrical chamber, ports located at both ends thereof, means for rotating said chamber around its horizontal axis, means for rotating said chamber around its vertical axis, and means for passing heating gases longitudinally through said chamber, said chamber being adapted to be fired from either end thereof.

2. A rotary furnace for refining copper which comprises a substantially cylindrical chamber, ports located at both ends thereof, means for rotating said chamber around its horizontal axis, means for rotating said furnace around its vertical axis, stationary means for introducing heating gases into said chamber at one end thereof, and a plurality of stationary connections at the opposite end of said chamber for withdrawing furnace gases at a plurality of positions of said chamber around its vertical axis.

3. A rotary furnace for refining copper which comprises a substantially cylindrical chamber, ports located at both ends thereof, means for rotating said chamber around its horizontal axis, means for rotating said furnace around its vertical axis, stationary means for introducing heating gases into said chamber at one end thereof, a plurality of stationary connections at the opposite end of said chamber for withdrawing furnace gases at a plurality of positions of said chamber around its vertical axis, and means for tilting said chamber on a vertical plane.

4. A rotary furnace for refining copper which comprises a substantially cylindrical chamber, ports located at both ends thereof, means for rotating said chamber around its horizontal axis, means for rotating said furnace around its vertical axis, stationary means for introducing heating gases into said chamber at one end thereof, a plurality of stationary connections at the opposite end of said chamber for withdrawing furnace gases at a plurality of positions of said chamber around its vertical axis, means for tilting said chamber on a vertical plane, and a plurality of air nozzles in the side of said chamber for forcing air through molten copper contained therein.

5. A rotary furnace for refining copper which comprises a substantially cylindrical chamber, ports located at both ends thereof, means for rotating said chamber around its horizontal axis, means for rotating said furnace around its vertical axis, stationary means for introducing heating gases into said chamber at one end thereof, a plurality of stationary connections at the opposite end of said chamber for withdrawing furnace gases at a plurality of positions of said chamber around its vertical axis, means for tilting said chamber on a vertical plane, a plurality of air nozzles in the side of said chamber for forcing air through molten copper contained therein, and means for conveying air to said air nozzles.

6. A rotary furnace for refining copper which comprises a substantially cylindrical chamber, ports located at both ends thereof, means for rotating said chamber around its horizontal axis, means for rotating said furnace around its vertical axis, stationary means for introducing heating gases into said chamber at one end thereof, a plurality of stationary connections at the opposite end of said chamber for withdrawing furnace gases at a plurality of positions of said chamber around its vertical axis, means for tilting said chamber on a vertical plane, a plurality of air nozzles in the side of said chamber for forcing air through molten copper contained therein, means for conveying air to said air nozzles, and means for withdrawing molten copper from said chamber.

7. A rotary furnace for refining copper which comprises a substantially cylindrical chamber, ports located at both ends thereof, means for rotating said chamber around its horizontal axis, means for rotating said furnace around its vertical axis, movable means for introducing heating gases into said chamber at one end thereof capable of being moved in front of said end at different positions of said chamber around its vertical axis, and a plurality of stationary connections at the opposite end thereof for withdrawing furnace gases at a plurality of positions of said chamber around its vertical axis.

8. A rotary furnace for refining metal which comprises a substantially cylindrical chamber adapted to be fired from either end thereof, means for rotating said chamber around its horizontal axis, means for rotating said furnace around its vertical axis, and means for passing heating gases longitudinally through said chamber at a plurality of positions of said chamber around its vertical axis.

9. A rotary furnace for refining metal which comprises a substantially cylindrical chamber adapted to be fired from either end thereof, ports located at either end of said chamber, firing means, a discharge flue, means for rotating said chamber around its horizontal axis, means for rotating said furnace around its vertical axis and means for moving said firing means in alignment with said chamber at a plurality of positions of the chamber around its vertical axis said furnace being movable to align its ports with said firing means and said discharge flue.

10. A rotary furnace for refining metals which comprises a substantially cylindrical chamber adapted to be fired from either end thereof, means for rotating said furnace around its horizontal axis, means for rotating said furnace around its vertical axis, means for passing heating gases longitudinally through said chamber at a plurality of positions around its vertical axis, and a plurality of nozzles in the side of said chamber for blowing air through molten metal contained therein.

11. A rotary furnace for refining metals which comprises a substantially cylindrical chamber adapted to be fired from either end thereof, means for rotating said furnace around its horizontal axis, means for rotating said furnace around its vertical axis, means for passing heating gases longitudinally through said chamber at a plurality of positions around its vertical axis, a plurality of nozzles in the side of said chamber for blowing air through molten metal contained therein, and means for reversing the rotation of said chamber when said nozzles reach the level of the molten metal contained therein.

12. A rotary furnace for refining metal which comprises a substantially cylindrical chamber, ports located at both ends of said chamber, means for rotating said chamber around its horizontal axis, means for rotating said furnace around its vertical axis, said furnace being mounted for tilting movement about a horizontal axis normal to the above-mentioned horizontal axis, and means adapted to co-operate with said ports in at least one predetermined position of said furnace around its vertical axis to introduce heating gases into said chamber and to remove furnace gases therefrom.

FELIX WARLIMONT.